（12) United States Patent
Buchmann

(10) Patent No.: US 9,143,045 B2
(45) Date of Patent: Sep. 22, 2015

(54) SWITCHED-MODE POWER SUPPLY USING AC-DC CONVERSION HAVING INVERTED CONTROL

(75) Inventor: Peter Buchmann, Lupsingen (CH)

(73) Assignee: AKTIEBOLAGET SKF, Gothenburg (SE)

( * ) Notice: Subject to any disclaimer, the term of this patent is extended or adjusted under 35 U.S.C. 154(b) by 68 days.

(21) Appl. No.: 12/840,042

(22) Filed: Jul. 20, 2010

(65) Prior Publication Data

US 2011/0248655 A1 Oct. 13, 2011

(30) Foreign Application Priority Data

Jul. 23, 2009 (DE) .......................... 10 2009 034 310

(51) Int. Cl.
*H02M 3/335* (2006.01)
*H02M 3/337* (2006.01)
*H02P 7/28* (2006.01)
*H02M 1/00* (2007.01)

(52) U.S. Cl.
CPC ................. *H02M 3/337* (2013.01); *H02P 7/28* (2013.01); *H02M 2001/0058* (2013.01); *Y02B 70/1491* (2013.01)

(58) Field of Classification Search
CPC ..................... H02M 3/337; H02M 2001/0058; H02M 3/335; H02P 7/28; H02P 31/00; Y02B 70/1491
USPC .......... 363/21.02, 21.04, 21.07–21.09, 21.12, 363/21.15–21.17, 15–17, 37, 55, 363/56.02–56.05, 56.11
See application file for complete search history.

(56) References Cited

U.S. PATENT DOCUMENTS

| 5,062,031 | A | | 10/1991 | Flachenecker et al. |
|---|---|---|---|---|
| 5,565,740 | A | * | 10/1996 | Hiramatsu et al. ........ 315/209 R |
| 5,576,941 | A | * | 11/1996 | Nguyen et al. ............. 363/21.07 |
| 6,031,738 | A | * | 2/2000 | Lipo et al. ........................ 363/37 |
| 6,256,209 | B1 | * | 7/2001 | Gurwicz et al. ................. 363/17 |
| 6,445,353 | B1 | * | 9/2002 | Weinbrenner ................ 343/763 |
| 7,193,872 | B2 | * | 3/2007 | Siri ............................... 363/95 |
| 2001/0009360 | A1 | * | 7/2001 | Jin ................................ 318/801 |
| 2007/0152609 | A1 | * | 7/2007 | Po ................................. 315/291 |
| 2008/0198638 | A1 | * | 8/2008 | Reinberger et al. ............. 363/74 |
| 2009/0034298 | A1 | | 2/2009 | Liu et al. |

FOREIGN PATENT DOCUMENTS

JP 1318547 A 12/1989

* cited by examiner

*Primary Examiner* — Jessica Han
*Assistant Examiner* — Gustavo Rosario Benitez
(74) *Attorney, Agent, or Firm* — Bryan Peckjian; SKF USA Inc. Patent Dept.

(57) ABSTRACT

A switched-mode power supply includes a first rectifier circuit configured to generate a first rectified voltage from an AC input voltage. An inverter generates a second AC voltage from the first rectified voltage. A transformer includes a primary coil coupled to the second AC voltage and a secondary coil. A second rectifier circuit is connected with the secondary coil and generates a second rectified voltage from a third AC voltage present at the secondary coil. The second rectified voltage is coupled to a node of the switched-mode power supply and represents or correlates to an output voltage thereof. A monitoring circuit shuts off the inverter when the second rectified voltage or the output voltage exceeds a predetermined first threshold, indicating an idle condition in the load and increasing energy efficiency.

12 Claims, 8 Drawing Sheets

SWITCHED-MODE POWER SUPPLY USING AC-DC CONVERSION HAVING INVERTED CONTROL

CROSS-REFERENCE

The present application claims priority to German patent application no. 10 2009 034 310.5, filed Jul. 23, 2009, the contents of which are fully incorporated herein by reference.

TECHNICAL FIELD

The present invention generally relates to a switched-mode power supply, e.g., a wide-range switched-mode power supply for a DC-motor.

BACKGROUND

Known switched-mode power supplies comprise, e.g., the following functional units: a rectifier for rectifying an input AC voltage, a filter circuit for filtering the rectified input AC voltage, a switching unit with a downstream-connected transformer, a further rectifier circuit with a filter circuit and if necessary a regulator mechanism. The regulator mechanism improves the efficiency of the switched-mode power supply by controlling, e.g., the impulse width of the clock signal and by thus adapting the energy intake to the energy consumption using a power factor corrector (PFC). The switching frequency can be relatively high, e.g., between 25 kHz and 500 kHz, or even higher. As a result, the transformer, which provides not only the transformation but also an electrical isolation, can be relatively small and easily implemented. The switching function itself is implemented with, e.g., transistors, more particularly MOSFETs, or thyristors, e.g., using pulse width modulation.

SUMMARY

In one aspect of the present teachings, an energy-saving switched-mode power supply is taught.

In another aspect of the present teachings, a switched-mode power supply may include a first rectifier circuit configured to generate a first rectified voltage from an AC input voltage for the switched-mode power supply. A resonance converter may be connected downstream of the first rectifier circuit and may comprise an inverter that generates an AC voltage from a DC voltage, e.g., the first rectified voltage. The resonance converter may also include a transformer having a primary coil coupled to the AC voltage and a secondary coil. A second rectifier circuit may be connected with the secondary coil of the transformer and may be configured to generate a second rectified voltage from the AC voltage present at the secondary coil of the transformer. The second rectified voltage may also be coupled with a node of the switched-mode power supply and may represent or correspond to an output voltage of the switched-mode power supply. A monitoring circuit may be configured to shut off the resonance converter when the second rectified voltage or the output voltage exceeds a predetermined first threshold.

The first rectifier circuit may generate the first rectified voltage from the input AC voltage that is, e.g., in the range of 85V to 264V. The inverter, which generates the AC voltage from a DC voltage, e.g., from the first rectified voltage, may comprise transistors and/or thyristors.

In another aspect of the present teachings, an active power factor correction circuit may be connected between the first rectifier circuit and the inverter of the resonance converter.

The active power factor correction circuit may generate a stabilized DC voltage from the first rectified voltage and the inverter may generate the AC voltage from the stabilized DC voltage. The active power factor correction circuit may generate, e.g., a stabilized DC voltage of, e.g., 264V or even 365V. Thus, it is possible for the AC input voltage to have a relatively large range of variation, without jeopardizing the reliability of the switched-mode power supply.

As indicated above, the second rectifier circuit may be connected with the secondary coil of the transformer. The transformer provides a galvanic isolation between the output voltage and the input AC voltage of the switched-mode power supply. The second rectified voltage may also serve as the output voltage, which is, e.g., 24V, or is substantially correlated or proportional to the output voltage.

The switched-mode power supply optionally may include one or more filter capacitors connected with the node so as to filter the second DC voltage.

In another aspect of the present teachings, a temperature monitor optionally may be coupled to the node, e.g., in the form of a PTC-resistor (PTC=positive temperature coefficient), in order to limit the output current of the switched-mode power supply if necessary.

In another aspect of the present teachings, a switched-mode power supply may be utilized to supply a DC-motor with a DC voltage. Thus, another aspect of the present teachings relates to an electronic drive including a switched-mode power supply and a DC-motor electrically coupled, e.g., connected at least indirectly, with the output voltage node of the switched-mode power supply. The DC motor either can have brushes or can be designed without brushes.

In order to change the rotating direction of the DC motor, the electronic drive may optionally include a control circuit connected between the switched-mode power supply and the DC motor. The control circuit may be configured to reverse the polarity of the output voltage of the switched-mode power supply for the DC-motor.

In some applications of the present teachings, the DC-motor is not in operation relatively frequently. This is the case, e.g., for a linear drive device, which represents a further aspect of the present teachings. Such a linear device may comprise, e.g., the above-described electronic drive and a device connected with the shaft of the DC-motor, which device is configured to convert a rotating movement generated by the shaft of the DC-motor into a linear movement (e.g., a linear actuator).

In order to reduce or minimize losses by the resonance converter during operation when the DC-motor is stopped, the switched-mode power supply preferably includes the monitoring circuit, which is designed to monitor the second rectified voltage, if applicable the output voltage of the switched-mode power supply, and to shut off the resonance converter if this voltage exceeds the predetermined first threshold. If the switched-mode power supply is not loaded (i.e. it is not supplying power to a load), which is the case for an idle and/or unloaded DC-motor, the second rectified voltage may be higher than during the operation of the DC-motor. Therefore, it is possible to detect an unloaded DC-motor by monitoring the second rectified voltage in order to shut off the resonance converter in such a case. For example, the first threshold, the exceeding of which causes the resonance converter to be shut off, may be or higher or greater than the operating voltage of the switched-mode power supply.

In another aspect of the present teachings, the monitoring circuit may be configured to switch on the resonance converter again after a predetermined period of time. However, if the second rectified voltage is detected as still being above the first threshold at this time, then the monitoring circuit is preferably configured to shut off the resonance converter again.

In another aspect of the present teachings, the monitoring circuit may be configured to turn on the resonance converter again when the second rectified voltage falls below a second threshold that is less than the first threshold. This embodiment provides a hysteresis functionality, thereby reducing the frequency of the switching that is necessary.

The monitoring circuit may include a voltage reference that is electrically coupled, e.g., connected at least indirectly, with the node and therefore is supplied with the second rectified electric voltage, or a voltage at least substantially proportional thereto.

The monitoring circuit is preferably configured to shut off the resonance converter when the voltage at the voltage reference exceeds a threshold that correlates to or is representative of the first threshold. The reference terminal of the reference voltage is thus supplied at least indirectly with the second rectified voltage or with a voltage at least substantially proportional thereto. When the switched-mode power supply is operating in a fully-loaded state, the voltage at the reference terminal of the voltage reference is a gauge for the magnitude of the second rectified voltage, so that it can be compared with the threshold that correlates to the first threshold in order to shut off the resonance converter when the second rectified voltage exceeds the first threshold.

In the loaded state, the electric current of the DC-motor is large enough, so that the output voltage, which represents the second DC voltage if applicable or at least correlates or is at least substantially proportional to the second DC voltage, remains below the first threshold and thus the resonance converter remains switched on, such that an AC voltage is applied to the transformer primary coil.

The monitoring circuit may include a series-connected resistor for the voltage reference. The resistor may be disposed, e.g., between the node and the voltage reference.

In another aspect of the present teachings, the monitoring circuit may include a voltage divider with a first resistor and a second resistor. The voltage divider may be electrically coupled, e.g., connected at least indirectly, with the output voltage node and is thus supplied with the second rectified electric voltage or a voltage at least substantially proportional thereto. The monitoring circuit may be configured to shut off the resonance converter when the voltage at the voltage divider, e.g., at the first resistor, exceeds a predetermined threshold that correlates to the first threshold. The voltage at the voltage divider corresponds to the voltage reference.

In another aspect of the present teachings, the switched-mode power supply may include another resistor that, e.g., is switchable by a transistor so that it is electrically connected in parallel with the second resistor. In such an embodiment, the transistor may be controllable at least indirectly by the second rectified voltage. In this case, both thresholds for the reference voltage of the voltage reference can be realized in a relatively simple way, such that when the upper threshold is exceeded, the resonance converter is shut-off and when the reference voltage falls below the lower threshold, the resonance converter is turned on again.

In another aspect of the present teachings, the monitoring circuit may provide an additional galvanic decoupling or isolation between the primary side and secondary side of the transformer of the resonance converter. In such an embodiment, the monitoring circuit may include a first sub-circuit comprising the voltage reference and a second sub-circuit coupled with the inverter and galvanically decoupled from the first sub-circuit. The second sub-circuit shuts off the resonance converter under the control of the first sub-circuit when the first sub-circuit detects that the first threshold has been exceeded. The galvanic decoupling can be realized, e.g., with an optical coupler that couples or connects the two sub-circuits of the monitoring circuit with each other.

In another aspect of the present teachings, the switched-mode power supply may further include a current source supplied by a further secondary coil of the transformer. The current source may be configured to inject an electric current having a substantially constant magnitude into the node. In this case, the current source limits the current from the further secondary coil (auxiliary coil) and if necessary raises the voltage at the filter capacitor above the first threshold when the switched-mode power supply is unloaded. Otherwise, there may be a risk that, when the switched-mode power supply is loaded, the relatively-large current will seek a current path through the relatively-weak auxiliary coil, if provided, and thereby destroy it.

Thus, representative embodiments of the present teachings may provide, depending on the particular application thereof, a wide-range switched-mode power supply for the DC-motor and more particularly for linear actuators. A relatively large input voltage range of e.g., 85V until 264V may be made possible, if necessary, by the optional active power factor correction. The transformer of the resonance converter may provide a galvanic isolation as well as a transformation of the electric power. The electric components are preferably designed for the maximal power (short circuit). The output current of the switched-mode power supply is preferably not monitored. A limit of the output current can be achieved by the inner resistor of the resonance converter. The primary resonance converter current may be monitored only in a time-delayed manner in order to enable a start-up of the DC-motor. An energy-saving stand-by circuit (monitoring circuit) may cause the resonance converter to operate in intervals in the idle state of the switched-mode power supply (e.g., when no electromotor is operated).

An advantage of at least some embodiments of the switched-mode power supplies disclosed herein is that, in particular in connection with a DC voltage and a linear actuator that is operated in particular by a controller, it can be operated with various power frequencies, e.g., 50 Hz or 60 Hz, and a relatively wide voltage range, e.g., 85V to 264V. The downstream resonance converter can be designed, e.g., for relatively high current peaks and can preferably be equipped with a delayed current monitor.

Further advantages, features, objects and embodiments of the invention will be readily derivable from the exemplary embodiments described in the following in conjunction with the appended Figures.

DETAILED DESCRIPTION OF THE PREFERRED EMBODIMENTS

Each of the additional features and teachings disclosed below may be utilized separately or in conjunction with other features and teachings to provide improved switching power supplies, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
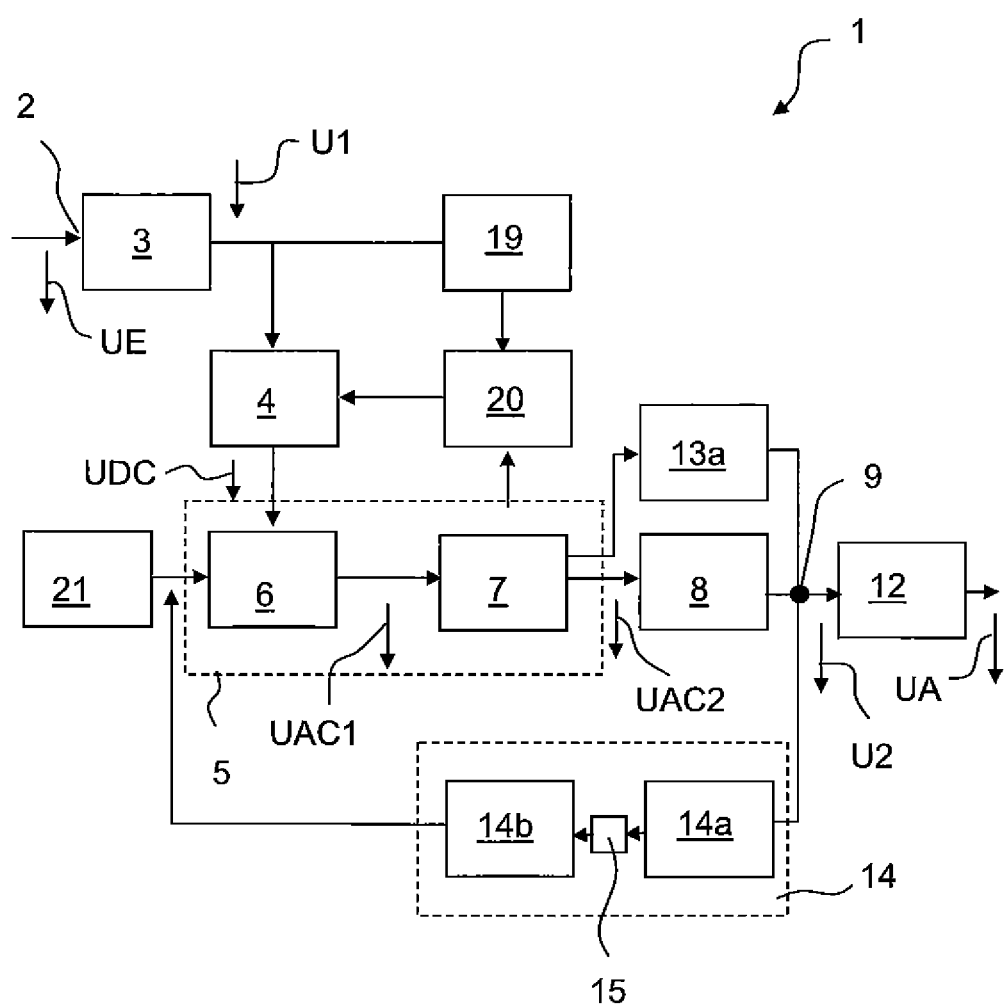
FIG. 1 shows a block circuit diagram of a representative switched-mode power supply.
Figure 2A:
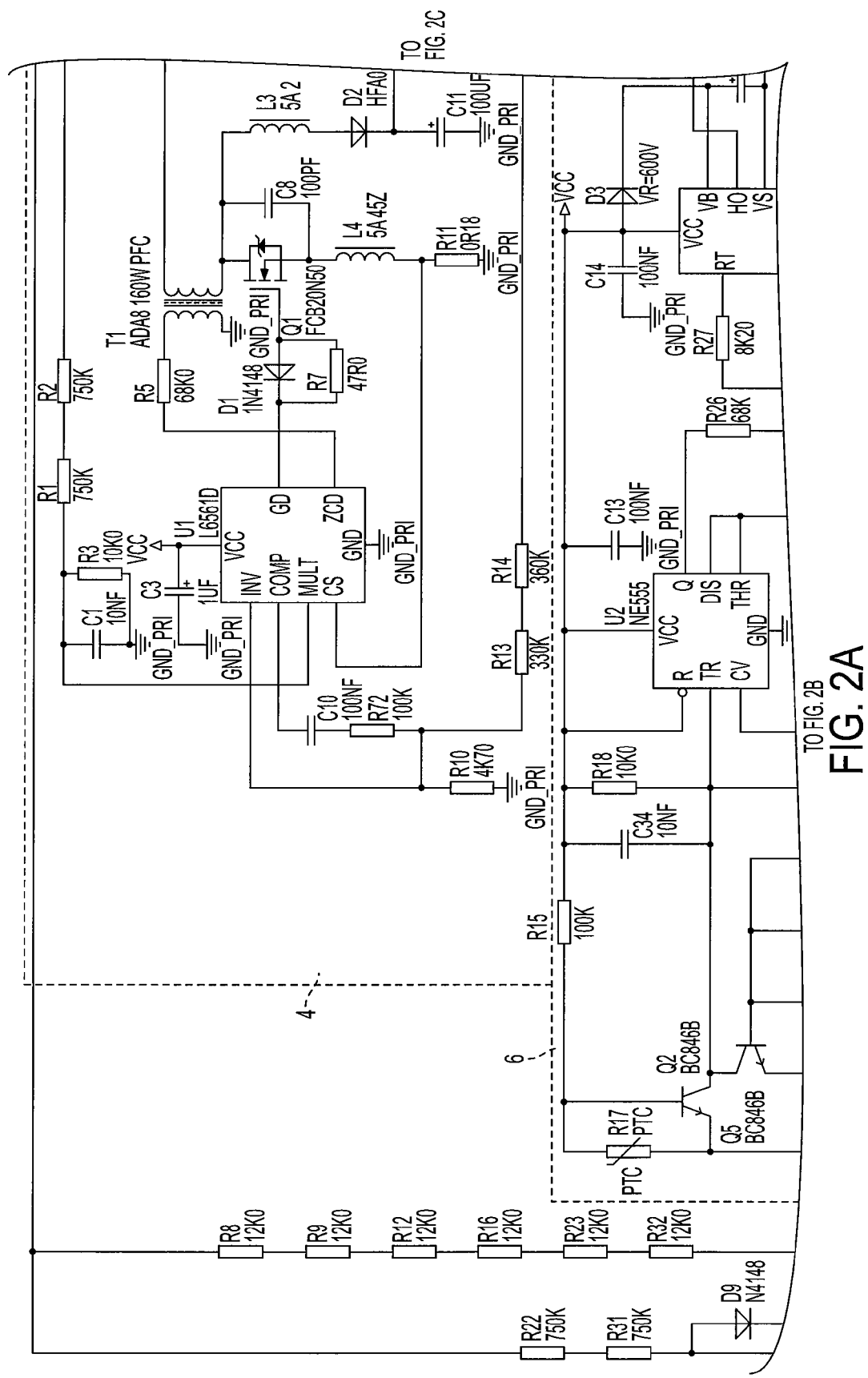
FIGS. 2A-2D respectively show four quadrants of a detailed circuit diagram of the representative switched-mode power supply.
Figure 2B:
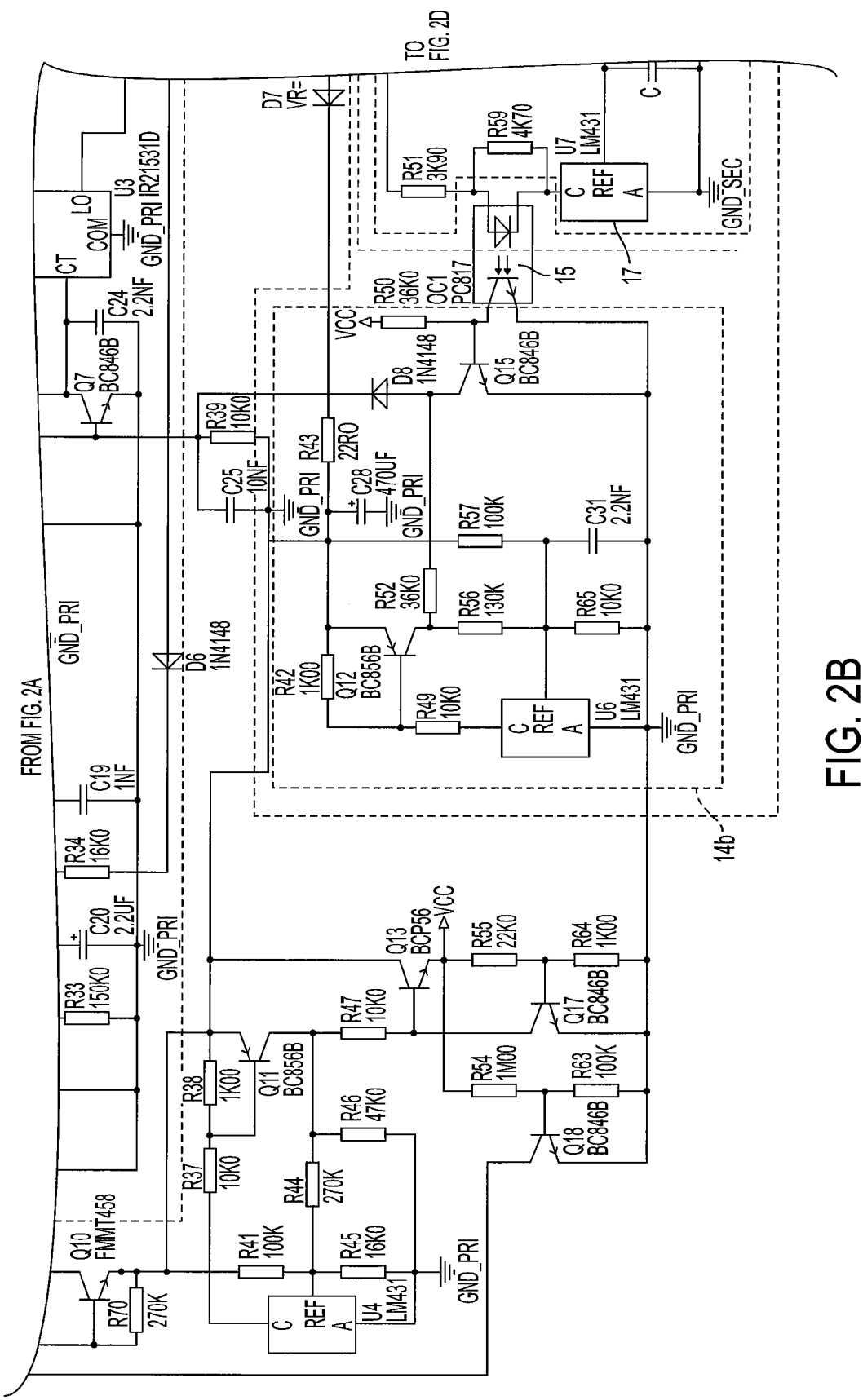
Figure 2C:
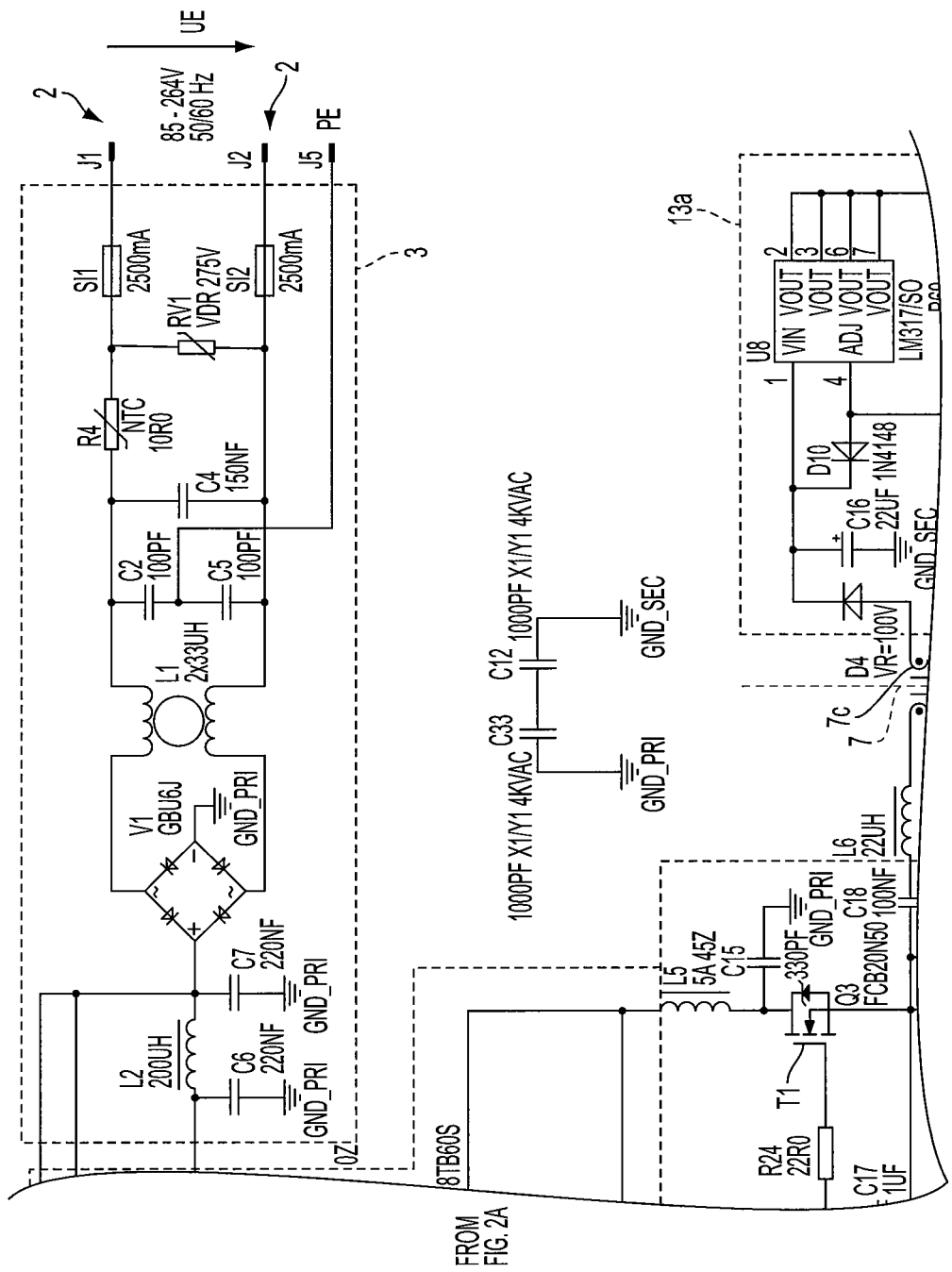
Figure 2D:
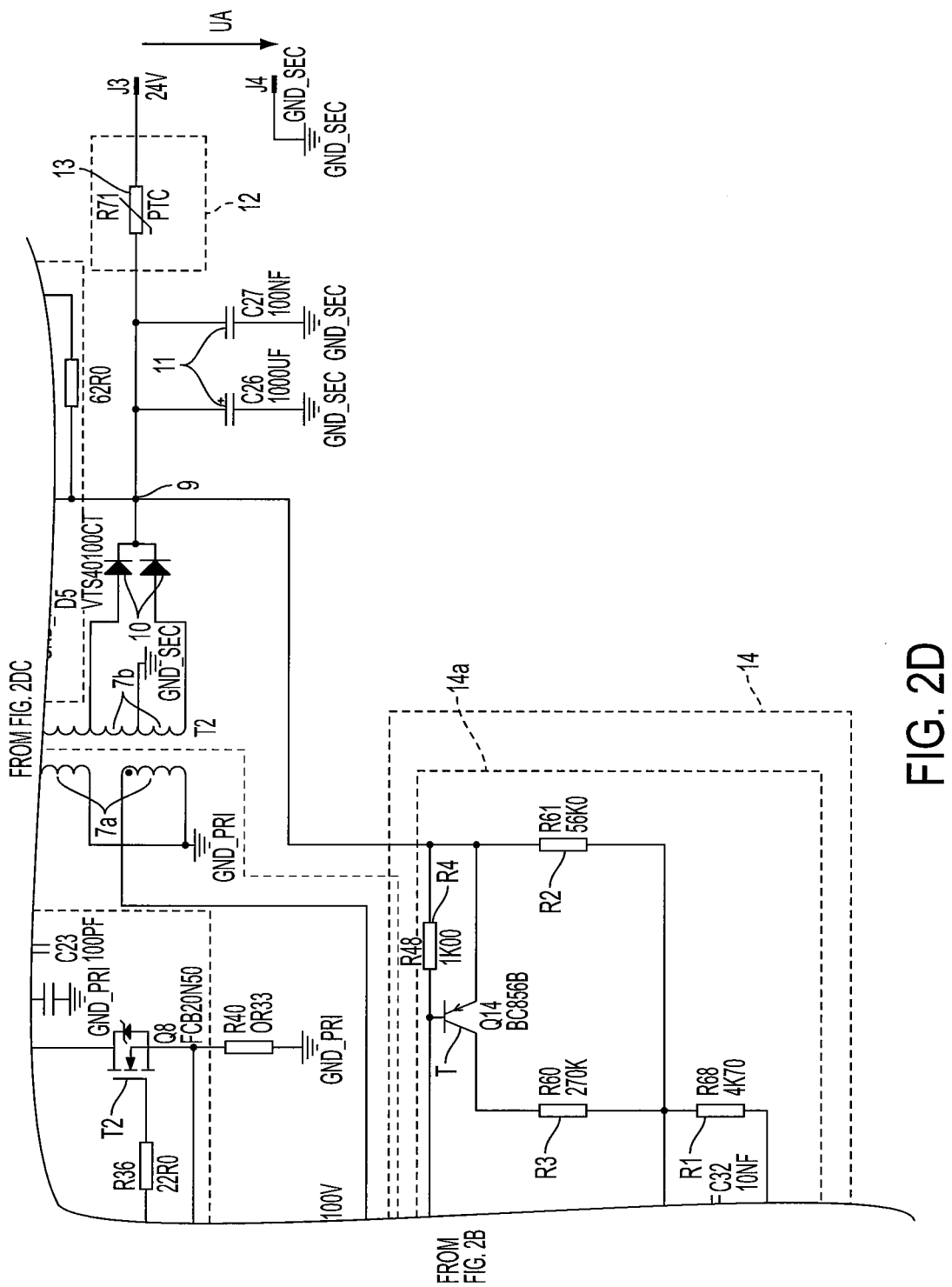

FIG. 1 shows a block circuit diagram of a switched-mode power supply 1 and FIG. 2 shows a circuit diagram as an example of a possible detailed implementation of the switched-mode power supply 1. FIG. 2 is subdivided into four Subfigures 2A to 2D for improved clarity. Thus, Subfigure 2A depicts the upper left area of the switched-mode power supply, Subfigure 2B depicts the lower left area, FIG. 2C depicts the upper right area and FIG. 2D depicts the lower right area.

The switched-mode power supply 1 has an input 2, to which, e.g., an input alternating current of the power supply system is coupled, e.g., an AC voltage from a commercial source. The alternating current, which is the input voltage UE of the switched-mode power supply 1, is preferably in the range of between 85V and 264V, although the present teachings are not limited to any particular voltage range.

The switched-mode power supply 1 has a first rectifier circuit 3 that rectifies the input voltage UE in order to generate a first rectified voltage U1.

In the present exemplary embodiment, an active power factor correction circuit 4 is connected downstream of the first rectifier 3 and generates a stabilized DC voltage UDC of, e.g., 264V from the first rectified voltage U1.

The DC voltage UDC is the input voltage of a resonance converter 5 of the switched-mode power supply 1. The resonance converter 5 includes an inverter 6 and a transformer 7. The DC voltage UDC generated by the active power factor correction circuit 4 is supplied to the inverter 6 as an input voltage. The inverter 6 then generates an AC voltage UAC1, e.g., having a relatively high frequency, from this DC voltage UDC. For example, as shown in FIGS. 2A-2D, the inverter 6 may be designed as a half bridge and may comprise two power transistors T1, T2 that are, e.g., power MOSFETs. The two power transistors T1, T2 are controlled in a generally known manner in order to generate the AC voltage UAC1 from the DC voltage UDC. The inverter 6 may be operated, e.g., based upon pulse width modulation (PWM).

The transformer 7 of the resonance converter 5 includes primary coils 7a, to which the AC voltage generated by the inverter 6 is coupled, and secondary coils 7b. The transformed AC voltage UAC2 is present at the secondary coils 7b and is rectified by a second rectifier circuit 8 in order to generate a second rectified voltage U2, which is coupled with a node 9 of the switched-mode power supply 1.

In the present exemplary embodiment, the second rectifier circuit 8 includes two diodes 10 and two filter capacitors 11 connected in parallel.

The switched-mode power supply 1 further includes a temperature monitor 12, e.g., in the form of a PTC-resistor 13, which limits the output current of the switched-mode power supply 1. The DC voltage at the output of the temperature monitor 12 is the output voltage UA of the switched-mode power supply 1.

In the present exemplary embodiment, the transformer 7 includes a further secondary coil constructed as an auxiliary coil 7c that is connected with a current source 13a. The output of the current source 13a is connected with the node 9. The current source 13a generates an electric current, which is injected into the node 9 and has the object of limiting the current from the auxiliary coil 7c of the transformer 7, as was discussed in the Summary section above.

The switched-mode power supply 1 also includes a monitoring circuit 14 configured to monitor the second rectified voltage U2 and thus the output voltage UA of the switched-mode power supply 1. The monitoring circuit 14 comprises, in the present exemplary embodiment, a first sub-circuit 14a and a second sub-circuit 14b, which are galvanically isolated from each other by an optical coupler 15. The first sub-circuit 14a is connected with the node 9 and the second sub-circuit 14b is connected with the resonance converter 5, in particular with the inverter 6 and its controller. The second sub-circuit 14b is configured to shut off the inverter 6 and thus the resonance converter 5 as needed and also to turn them on again.

Figure 3:
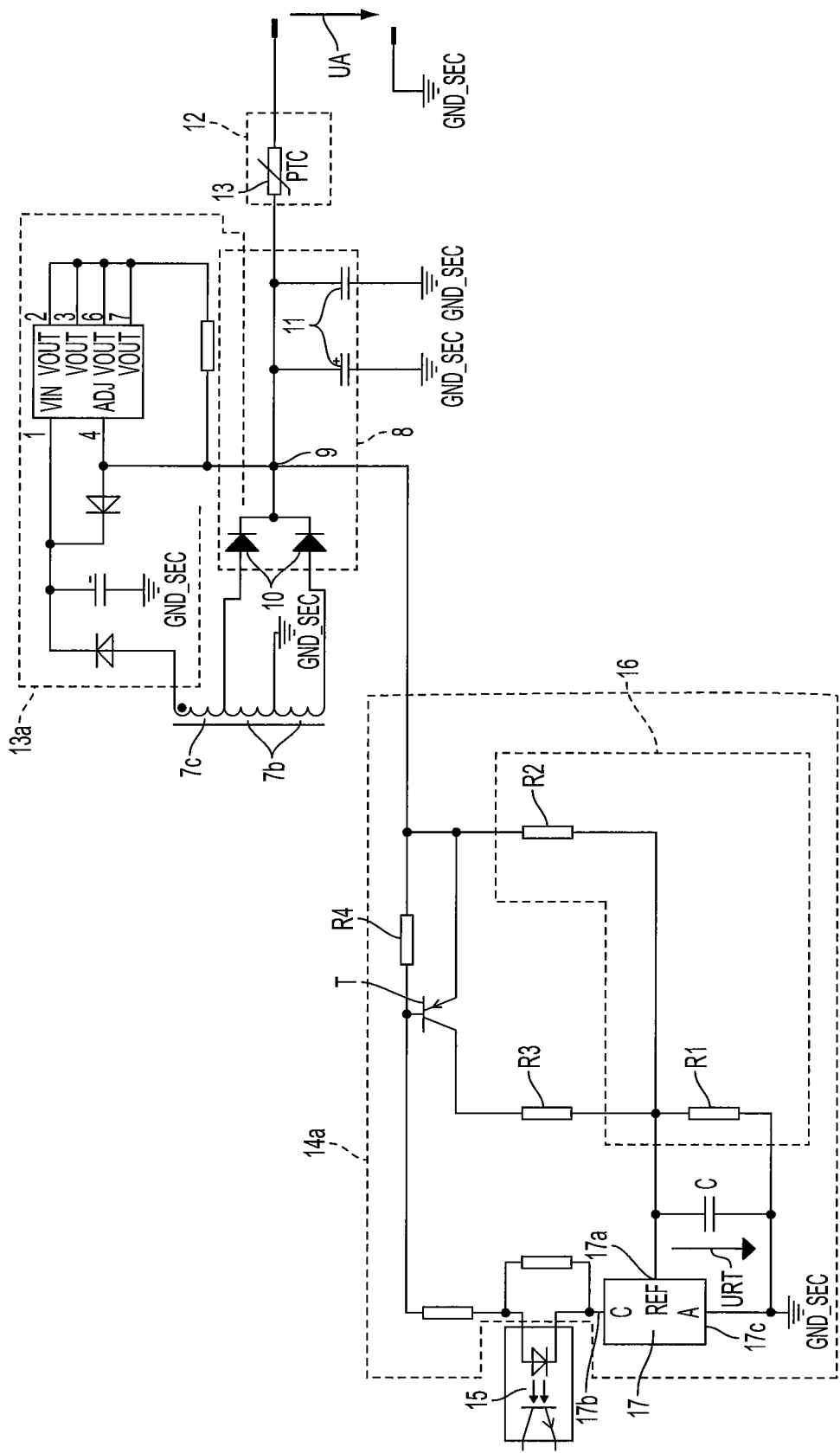
FIG. 3 shows a portion of the switched-mode power supply of FIG. 1 in further detail.

Thus, the secondary coil 7, the auxiliary coil 7c, the current source 13a, the first temperature monitor 12 and the first sub-circuit 14a of the monitoring circuit 14, which are depicted in the FIG. 3 in more detail, are decoupled from the remainder of the switched-mode power supply 1 in a galvanic manner.

In the present exemplary embodiment, the first sub-circuit 14a of the monitoring circuit 14 includes a voltage divider 16 having a first resistor R1 connected in series with a second resistor R2. The voltage divider 16 is connected with the ground on the one side and with the node 9 on the other side. The first sub-circuit 14a further includes a component 17 having an input 17a that is electrically connected with the middle point of the voltage divider 16. A capacitor C may be connected in parallel with the resistor R1.

The component 17 is configured such that, when the voltage at its input 17a, which corresponds to the voltage URT at the voltage divider 16, exceeds a predetermined threshold, e.g., 2.5V, the component 17 allows a current to flow between its terminals 17b, 17c. The terminal 17b is connected with the optical coupler 15 and the other terminal 17c is connected with the ground. Therefore, when the voltage URT of the voltage divider 16 exceeds the threshold (here 2.5 V), the optical coupler 15 sends a signal from the first sub-circuit 14a to the second circuit part sub-circuit 14b, whereupon the second sub-circuit 14b shuts off the resonance converter 5, and more particularly its inverter 6.

The resistor R1 of the voltage divider 16 is connected with the node 9 via the resistor R2. Therefore, the voltage at the input 17a of the component 17 serves as a gauge for the second rectified voltage U2 and/or the output voltage UA. That is, the voltage at input 17a correlates or is at least substantially proportional to the output voltage UA and serves as a suitable representation thereof for the feedback control purposes that will be further described below.

Figure 4:
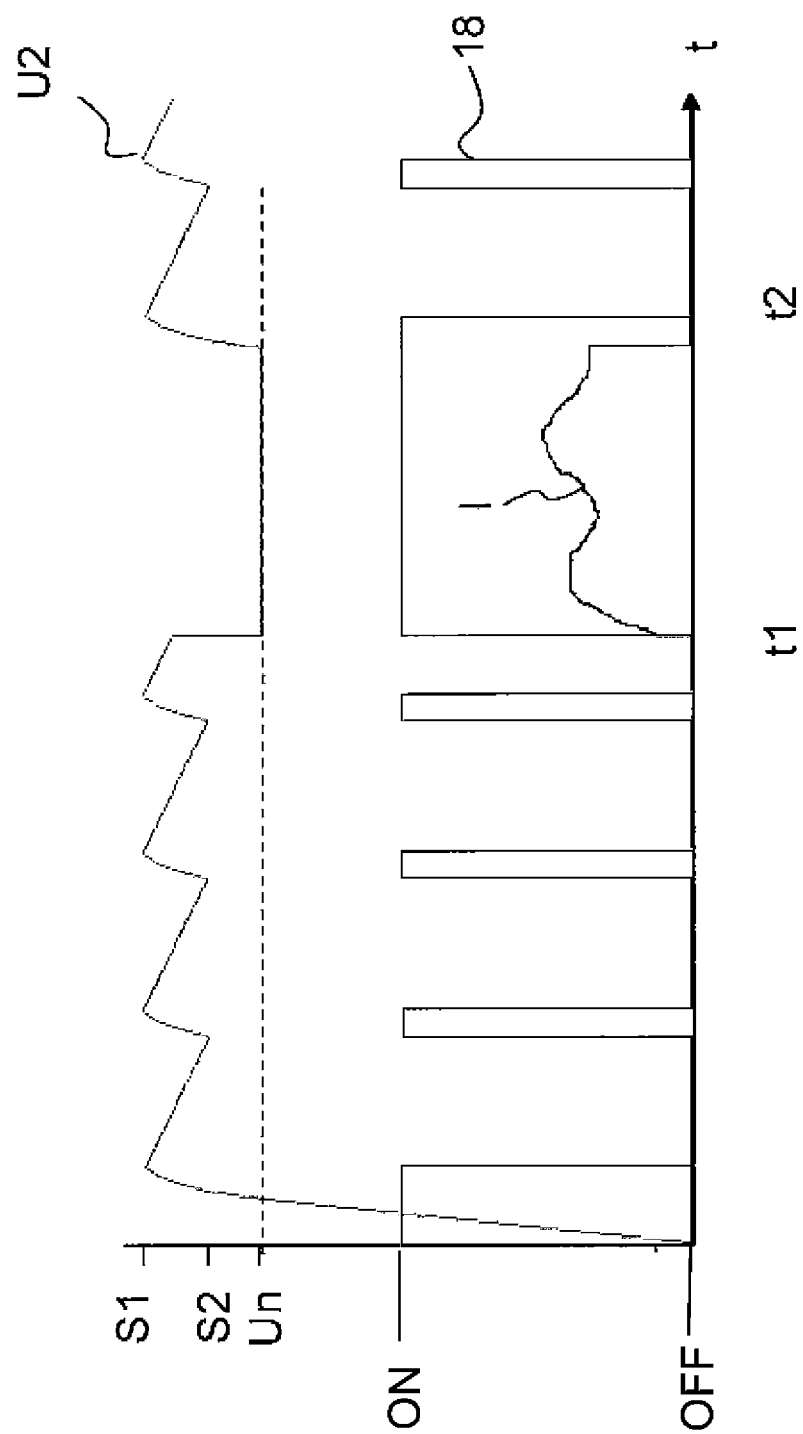
FIG. 4 shows an electric voltage curve depicting a representative use of the switched-mode power supply.

The voltage divider 16, the resistor R1, the resistor R2, the component 17 and the threshold thereof, respectively, are preferably designed or selected so that the optical coupler 15 sends the "OFF" shut-off signal 18 shown in the FIG. 4 to the second sub-circuit 14b when the second rectified voltage U2 and/or the output voltage UA of the switched-mode power supply 1 exceeds a first threshold S1. The first threshold S1 is greater than the operating voltage Un of the switched-mode power supply 1. In FIG. 4, the resonance converter 5 is configured so that it is turned on when the shut-off signal 18 corresponds to logic signal "1" (i.e. "ON") and it is shut off when the shut-off signal 18 corresponds to logic signal "0" (i.e. "OFF").

The first sub-circuit 14a of the monitoring circuit 14 may additionally include a transistor T and a third resistor R3, which is switchable by the transistor T into electrical connection in parallel with the resistor R2. The base of the transistor T is connected with the optical coupler 15 and with the node 9 via a fourth resistor R4. As soon as the optical coupler 15 conducts (i.e. a "OFF" signal 18 is emitted that corresponds to logic signal "0"), an electric current flows, thereby switching on the transistor T through its base, which causes the transistor T to connect the resistor R3 in parallel with the resistor R2. As a result, the voltage at the voltage divider 16 will increase. With the resistor R3 connected in parallel with the resistor R2, the threshold of the component 17 now corresponds to the lower second threshold S2.

When the resonance converter 5 is shut off, the filter capacitors 11 discharge and consequently the voltage of the filter capacitors 11 and thus the voltage URT of the voltage divider 16 also decreases. If the voltage URT of the voltage divider 16 falls below the threshold of the component 17 (here 2.5 V), then the component 17 deactivates, so that no more current flows through the optical coupler 15, whereupon the optical coupler 15 changes its state such that no optical signal is emitted. This corresponds to an "ON" signal with logic "1". As a result, the monitoring circuit 14, in particular the second sub-circuit 14b, causes the resonance converter 5 to be switched on again.

When the second rectified voltage U2 first exceeds the first threshold S1, the third resistor R3 is not yet connected parallel with the second resistor R2, but it is then connected after the first threshold S1 has been exceeded. Consequently, after the first threshold S1 of the second rectified voltage U2 is exceeded and the resistors R2 and R3 are connected in parallel, the voltage at the middle point of the voltage divider 16 will fall below the threshold of the component 17 again only after the second rectified voltage U2 falls below the second threshold S2, which is less than the first threshold S1. In the present exemplary embodiment, the second threshold S2 is still larger or higher than the operating voltage Un.

Thus, the switching-in of the third resistor R3 provides a hysteresis to the feedback control, thereby allowing the resonance converter 5 to remain off until the output voltage UA falls below the lower second threshold S2. This reduces the required switching frequency of the resonance converter 5 and thus improves system efficiency.

When a load is placed on the switched-mode power supply 1, it operates at the operating voltage Un, so that the second rectified voltage U2 does not exceed the first threshold S1. Consequently, the monitoring circuit 14 does not shut off the resonance converter 5. This is demonstrated in FIG. 4 between the time points t1 and t2. During this time period, the load on the switched-mode power supply 1 results in the supply of a relatively high electric current I.

In the present exemplary embodiment, the switched-mode power supply 1 may also include a starting circuit 19, a voltage regulator 20 for regulating the stabilized DC voltage UDC of the active power factor correction circuit 4 and a temperature monitoring circuit with a current limiter 21 for the inverter 6 of the resonance converter 5.

Figure 5:
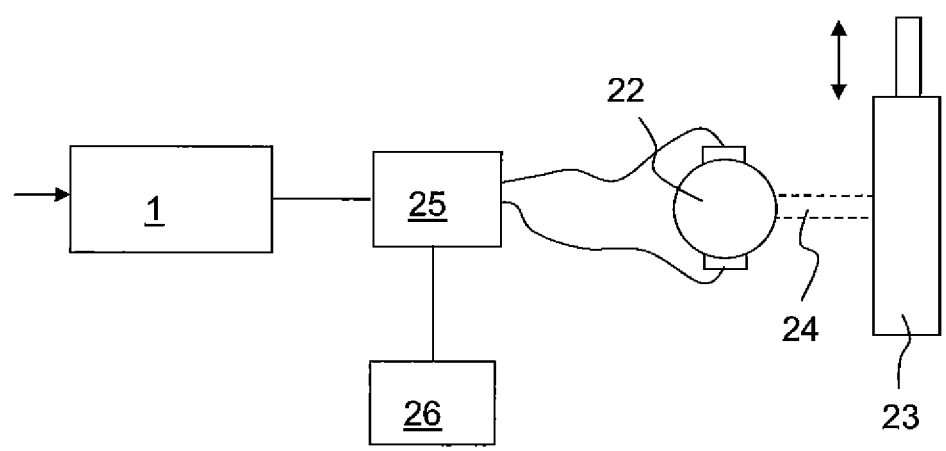
FIG. 5 shows an electronic DC drive comprising the switched-mode power supply and DC-motor driving a linear actuator.

In a further embodiment of the present teachings, the switched-mode power supply 1 may to drive a DC-motor, as is illustrated in FIG. 5. In this embodiment, the shaft 24 of the DC-motor 22, in turn, drives a linear actuator 23, which converts a rotating movement generated by the DC-motor 22 into a linear movement.

In order to change the rotating direction of the DC-motor 22, a control circuit 25 may be connected between the switched-mode power supply 1 and the DC-motor 22. The control circuit 25 is configured to reverse the polarity of the output voltage UA of the switched-mode power supply 1 for the DC-motor 22. The control circuit 25 can be controlled via a bus with a control element 26, e.g., an operator-controlled switch or controller.

REFERENCE NUMBER LIST 1 switched-mode power supply
2 input
3 rectifier circuit
4 active power factor correction circuit
5 resonance converter
6 inverter
7 transformer
7a primary coil
7b secondary coil
7c auxiliary coil
8 rectifier circuit
9 node
10 diode
11 filter capacitor
12 temperature monitor
13 PTC-resistor
13a current source
14 monitoring circuit
14a second sub-circuit
14b second sub-circuit
15 optical coupler
16 voltage divider
17 component
17a input
17b, 17c terminals
18 shut-off signal
19 starting circuit
20 voltage regulator
21 temperature monitor circuit with a current limiter
22 DC-motor
23 linear actuator
24 shaft
25 control circuit
26 control element
C capacitor
I current
R1-R4 resistor
S1, S2 threshold t1, t2 time point
T1, T2 transistor
UA output voltage
Un operating voltage
UAC1 first AC voltage
UAC2 second AC voltage
UDC stabilized DC voltage
UE input voltage
URT voltage
U1 first rectified voltage
U2 second rectified voltage

The invention claimed is:

1. A switched-mode power supply for an output DC voltage supplied to a motorized load, comprising:
    a first rectifier circuit configured to generate a first rectified voltage from a first AC voltage, which is an input power source for the switched-mode power supply,
    an inverter configured to generate a second AC voltage from the first rectified voltage,
    a transformer having a primary coil electrically coupled to the second AC voltage and a secondary coil generating a third AC voltage,
    a second rectifier circuit electrically coupled with the secondary coil of the transformer, the second rectifier circuit being configured to generate a second rectified voltage from the third AC voltage, the second rectified voltage correlating to or being at least substantially proportional to the output DC voltage,
    a monitoring circuit configured to shut off the inverter when at least one of the second rectified voltage and the output DC voltage exceeds a predetermined first threshold, thereby disabling the inverter during idle intervals of the motorized load,
    at least one capacitor electrically coupled to the second rectifier circuit and disposed between the second rectified voltage and ground, the at least one capacitor configured to discharge when the inverter is switched off until a voltage of the at least one capacitor falls below a predetermined second threshold that is less than the first threshold, thereby causing the monitoring circuit to turn on the inverter, and
    a voltage divider having a first resistor and a second resistor, the voltage divider being electrically coupled with the second rectified voltage, and wherein the monitoring circuit is configured to switch off the inverter when the voltage at a middle point of the voltage divider exceeds a predetermined third threshold that correlates with the first threshold, wherein the voltage divider is disposed between the output DC voltage or the second rectifier circuit and ground, wherein the middle point of the voltage divider is electrically coupled with a first terminal of a three-terminal component that is configured to conductively connect its second and third terminals with each other when the voltage at the first terminal exceeds a voltage threshold that correlates with the third threshold, and wherein the conductive connection of the second and third terminals causes the inverter to be switched off, and
    wherein the monitoring circuit further comprises:
        a first sub-circuit comprising the voltage divider and a second sub-circuit coupled with the inverter and galvanically decoupled from the first sub-circuit, the second sub-circuit being configured to switch off the inverter under control of the first sub-circuit when the first sub-circuit detects that the first threshold has been exceeded, and
        an optical coupler that optically connects the first and second sub-circuits at least when the first threshold has been exceeded.

2. A switched-mode power supply according to claim 1, further comprising an active power factor correction circuit electrically connected between the first rectifier circuit and the inverter, the active power factor correction circuit being configured to generate a stabilized DC voltage from the first rectified voltage, which is supplied to the inverter such that the inverter generates the second AC voltage from the stabilized DC voltage.

3. A switched-mode power supply according to claim 1, wherein the at least one capacitor comprises at least two capacitors in parallel.

4. A switched-mode power supply according to claim 3, wherein the monitoring circuit is configured to switch on the inverter again after a predetermined period of time.

5. A switched-mode power supply according to claim 1, further comprising a third resistor configured to be electrically connected in parallel with the second resistor in response to the second rectified voltage exceeding the first threshold.

6. A switched-mode power supply according to claim 1, further comprising:
    a second secondary coil of the transformer; and
    a current source electrically coupled to the second secondary coil and configured to supply a substantially-constant magnitude electric current to a node electrically coupled to the output of the second rectifier circuit.

7. A motion driving apparatus comprising:
    a switched-mode power supply for an output DC voltage, comprising:
        a first rectifier circuit configured to generate a first rectified voltage from a first AC voltage, which is an input power source for the switched-mode power supply,
        an inverter configured to generate a second AC voltage from the first rectified voltage,
        a transformer having a primary coil electrically coupled to the second AC voltage and a secondary coil generating a third AC voltage,
        a second rectifier circuit electrically coupled with the secondary coil of the transformer, the second rectifier circuit being configured to generate a second rectified voltage from the third AC voltage, the second rectified voltage correlating to or being at least substantially proportional to the output DC voltage, and
        a monitoring circuit configured to shut off the inverter when one of the second rectified voltage and the output DC voltage exceeds a predetermined first threshold,
        at least one capacitor electrically coupled to the second rectifier circuit and disposed between the second rectified voltage and ground, the at least one capacitor configured to discharge when the inverter is switched off until a voltage of the at least one capacitor falls below a predetermined second threshold that is less than the first threshold, thereby causing the monitoring circuit to turn on the inverter,
        a DC-motor electrically coupled with the output voltage of the switched-mode power supply, wherein the inverter is thereby disabled during idle intervals of the DC-motor,
        a voltage divider having a first resistor and a second resistor, the voltage divider being electrically coupled with the second rectified voltage, and wherein the monitoring circuit is configured to switch off the inverter when the voltage at a middle point of the voltage divider exceeds a predetermined third threshold that correlates with the first threshold, wherein the voltage divider is disposed between the output DC voltage or the second rectifier circuit and ground, wherein the middle point of the voltage divider is electrically coupled with a first terminal of a three-terminal component that is configured to conductively connect its second and third terminals with each other when the voltage at the first terminal exceeds a voltage threshold that correlates with the third threshold, and wherein the conductive connection of the second and third terminals causes the inverter to be switched off, and wherein the monitoring circuit further comprises:
  a first sub-circuit comprising the voltage divider and a second sub-circuit coupled with the inverter and galvanically decoupled from the first sub-circuit, the second sub-circuit being configured to switch off the inverter under control of the first sub-circuit when the first sub-circuit detects that the first threshold has been exceeded, and
  an optical coupler that optically connects the first and second sub-circuits at least when the first threshold has been exceeded.

8. The motion driving apparatus according to claim 7, further comprising a controller electrically connected between the switched-mode power supply and the DC-motor, the controller being configured to reverse the polarity of the output voltage of the switched-mode power supply to be supplied to the DC-motor.

9. The motion driving apparatus according to claim 8, further comprising:
  a linear actuator connected to a shaft of the DC-motor, the linear actuator being configured to convert a rotating movement generated by the shaft into a linear movement.

10. The motion driving apparatus according to claim 7, further comprising:
  a third resistor configured to be electrically connected in parallel with the second resistor in response to the second rectified voltage exceeding the first threshold;
  an auxiliary coil, and
  a current source electrically coupled to the auxiliary coil and configured to supply a substantially-constant magnitude electric current to a node electrically coupled to the output of the second rectifier circuit.

11. The motion driving apparatus according to claim 10, further comprising a controller electrically connected between the switched-mode power supply and the DC-motor, the controller being configured to reverse the polarity of the output voltage of the switched-mode power supply to be supplied to the DC-motor.

12. The motion driving apparatus according to claim 11, further comprising:
  a linear actuator connected to a shaft of the DC-motor, the linear actuator being configured to convert a rotating movement generated by the shaft into a linear movement.

* * * * *